(12) United States Patent
Yao et al.

(10) Patent No.: US 9,960,949 B2
(45) Date of Patent: May 1, 2018

(54) PERSONAL AREA NETWORK MANAGEMENT METHOD AND PERSONAL AREA NETWORK SYSTEM

(71) Applicant: ZTE Corporation, Shenzhen, Guangdong (CN)

(72) Inventors: Lizhe Yao, Shenzhen (CN); Jun Chen, Shenzhen (CN); Guoqiang Shang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 671 days.

(21) Appl. No.: 14/402,967

(22) PCT Filed: Apr. 19, 2013

(86) PCT No.: PCT/CN2013/074470
§ 371 (c)(1),
(2) Date: Nov. 21, 2014

(87) PCT Pub. No.: WO2013/177982
PCT Pub. Date: May 12, 2013

(65) Prior Publication Data
US 2015/0200801 A1 Jul. 16, 2015

(30) Foreign Application Priority Data
May 28, 2012 (CN) .......................... 2012 1 0169160

(51) Int. Cl.
*H04L 12/24* (2006.01)
*H04W 4/20* (2018.01)
(Continued)

(52) U.S. Cl.
CPC ............ *H04L 41/046* (2013.01); *H04L 41/18* (2013.01); *H04L 67/28* (2013.01); *H04W 4/203* (2013.01); *H04L 67/16* (2013.01); *H04W 84/10* (2013.01)

(58) Field of Classification Search
None
See application file for complete search history.

(56) References Cited

U.S. PATENT DOCUMENTS

2008/0062958 A1\* 3/2008 Jonsson ................. H04L 41/00
370/350
2012/0117190 A1 5/2012 Park
(Continued)

FOREIGN PATENT DOCUMENTS

CN 102164404 A 8/2011
CN 102236666 A 11/2011
(Continued)

OTHER PUBLICATIONS

Supplementary European Search Report in European application No. 13797949.8, dated Mar. 6, 2015.
(Continued)

*Primary Examiner* — Jeffrey R Swearingen
(74) *Attorney, Agent, or Firm* — Oppedahl Patent Law Firm LLC

(57) ABSTRACT

A Personal Area Network (PN) management method is disclosed. The method includes that a PN manager is set for a PN to manage the PN. Correspondingly, a PN system is disclosed. By the method and system, a user can set a PN manager and managed PN equipment of his/her own PN according to his/her own needs, and when a large amount of equipment exists in the PN, some PN equipment in the PN can be conveniently, rapidly and effectively managed through the PN manager.

18 Claims, 5 Drawing Sheets

(51) Int. Cl.
*H04L 29/08* (2006.01)
*H04W 84/10* (2009.01)

(56) References Cited

U.S. PATENT DOCUMENTS

| | | |
|---|---|---|
| 2012/0296937 A1 | 11/2012 | Chen |
| 2013/0041995 A1 | 2/2013 | Yao |
| 2013/0041996 A1 | 2/2013 | Yao et al. |
| 2014/0330972 A1 | 11/2014 | Jeong et al. |

FOREIGN PATENT DOCUMENTS

| | | | |
|---|---|---|---|
| CN | 102238485 | A | 11/2011 |
| CN | 102281627 | A | 12/2011 |
| CN | 102404132 | A | 4/2012 |
| CN | 102447676 | A | 5/2012 |
| CN | 103999403 | A | 8/2014 |
| EP | 2793427 | A1 | 10/2014 |
| WO | 2012064122 | A2 | 5/2012 |

OTHER PUBLICATIONS

International Search Report in international application No. PCT/CN2013/074470, dated Aug. 1, 2013.

English Translation of the Written Opinion of the International Search Authority in international application No. PCT/CN2013/074470, dated Aug. 1, 2013.

"Converged Personal Network Service Core Technical Specification; OMA-TS-CPNS_Core-V1_0-20110503-C", OMA-TS-CPNS_CORE-V1_0-20110503-C, Open Mobile Alliance (OMA), 4330 La Jolla Village Dr., Suite 110 San Diego, CA 92122 ; USA, No. 1.0 May 3, 2011 (May 3, 2011), pp. 1 -246, XP064043369, Retrieved from the Internet: URL:ftp/Public_documents/CD/Permanent_documents/[retrieved on May 17, 2011], mailed on May 3, 2011.

"Converged Personal Network Service Core Technical Specification; OMA-TS-CPNS_Core-V1_0-20110503-C", OMA-TS-CPNS_CORE-V1_0-20110503-C, Open Mobile Alliance (OMA), 4330 La Jolla Village Dr., Suite 110 San Diego, CA 92122; USA, No. 1.0 May 3, 2011 (May 3, 2011), pp. 1-246, XP064043369, Retrieved from the Internet: URL:ftp/Public_documents/CD/Permanent_documents/[retrieved on May 17, 2011], mailed on May 3, 2011.

Seungmyeoung Jeong et al: "Method for device administration in converged network", May 25, 2012 (May 25, 2012), XP055377102, [retrieved on May 30, 2017], mailed on May 25, 2012.

* cited by examiner

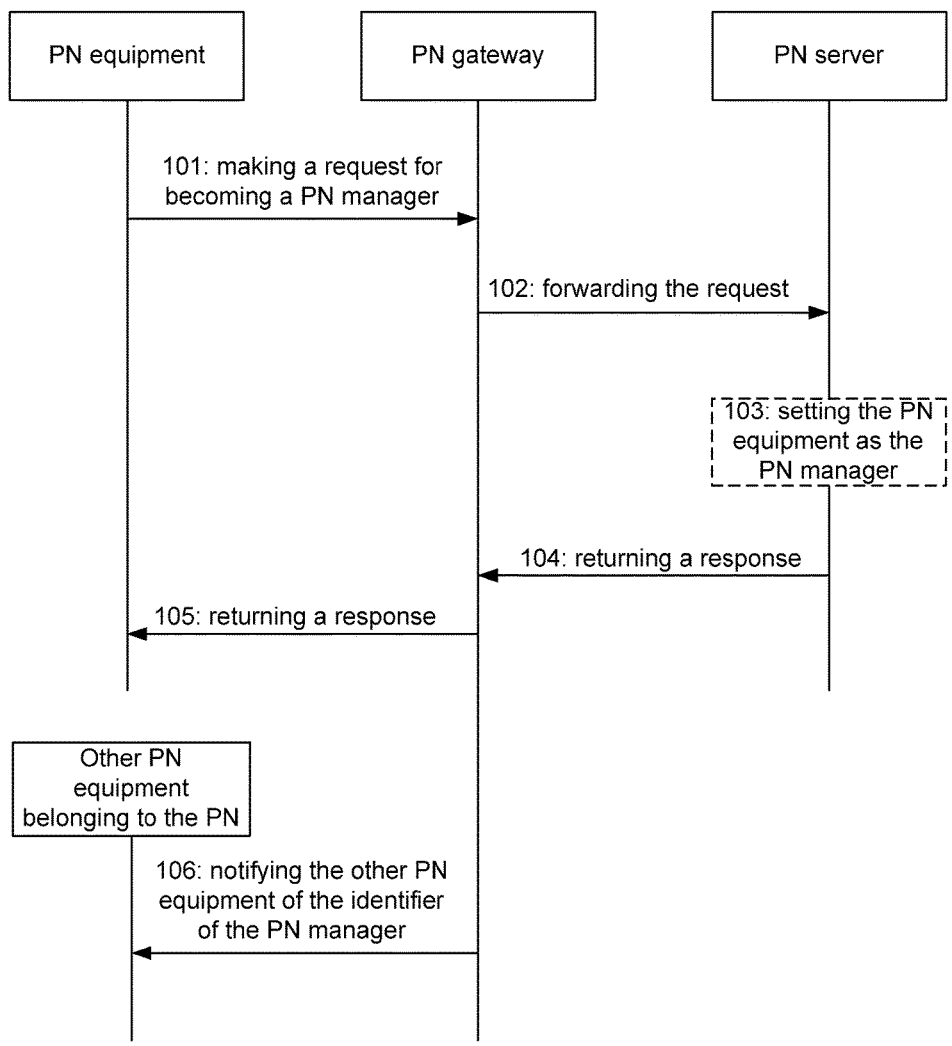

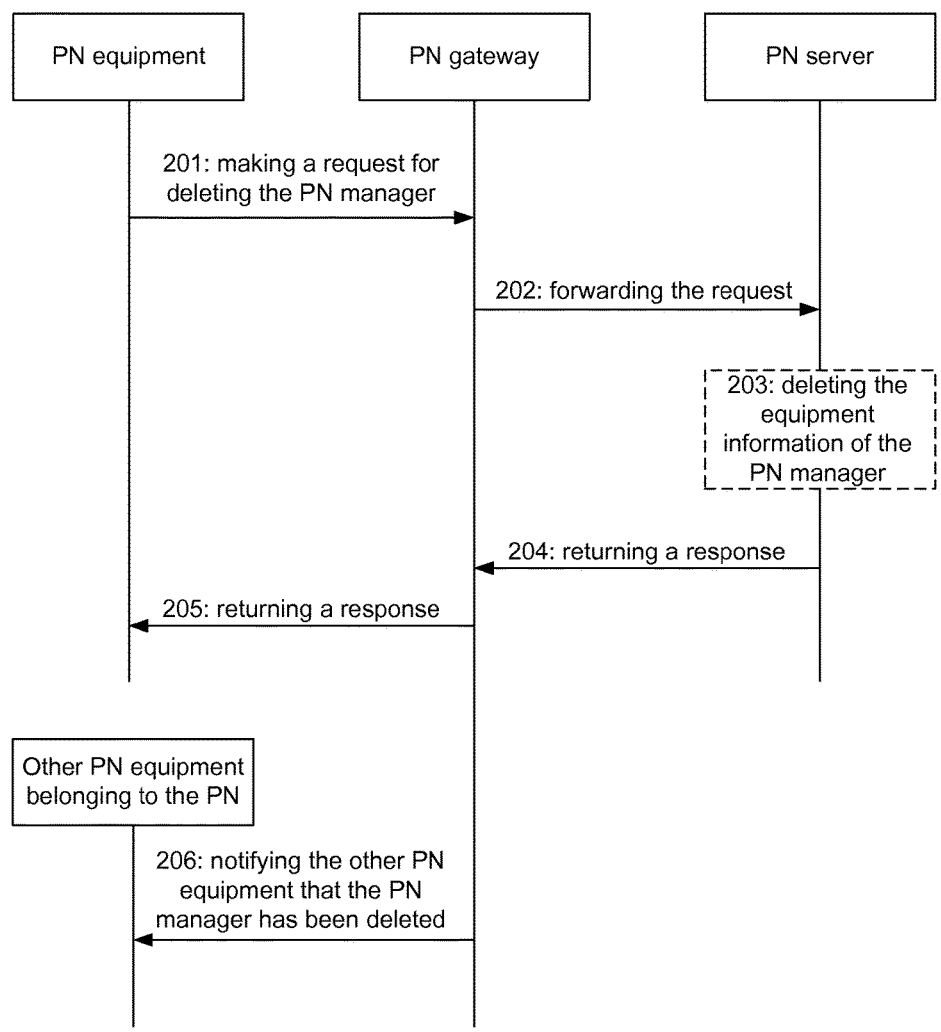

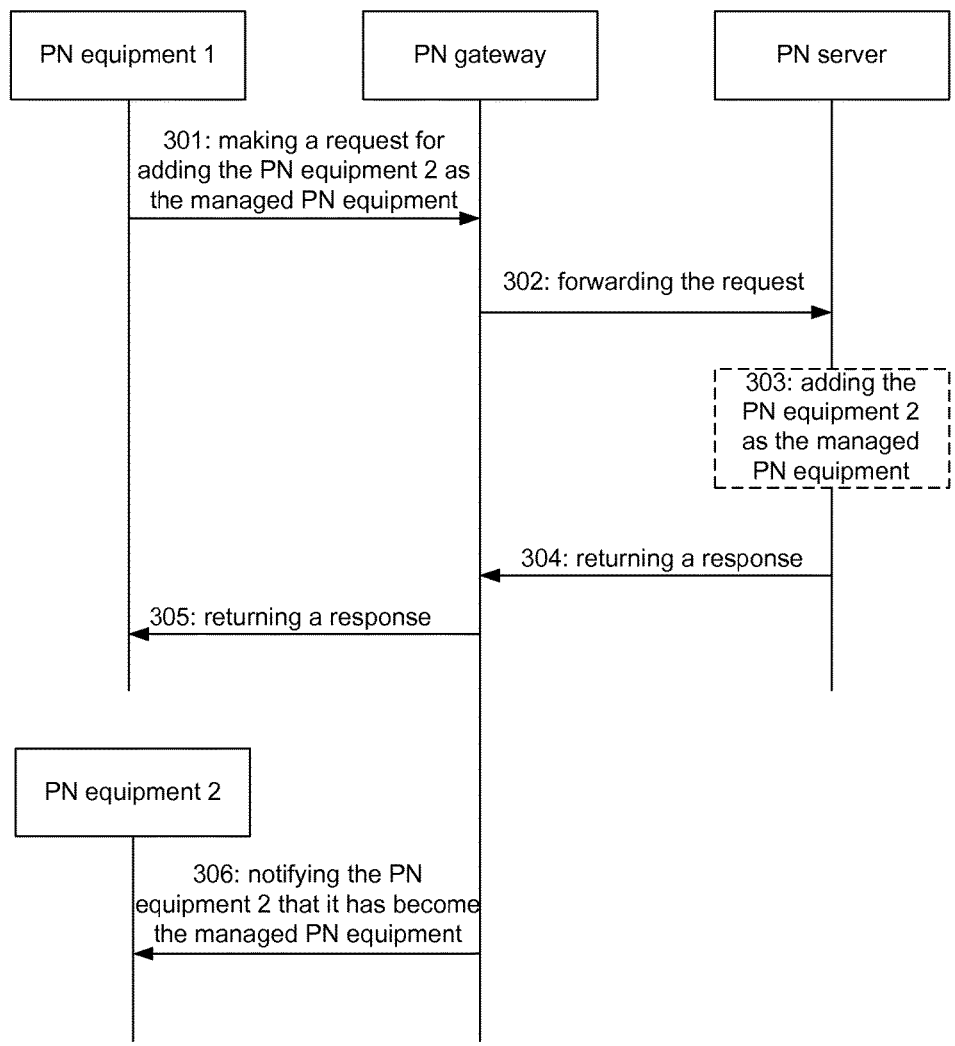

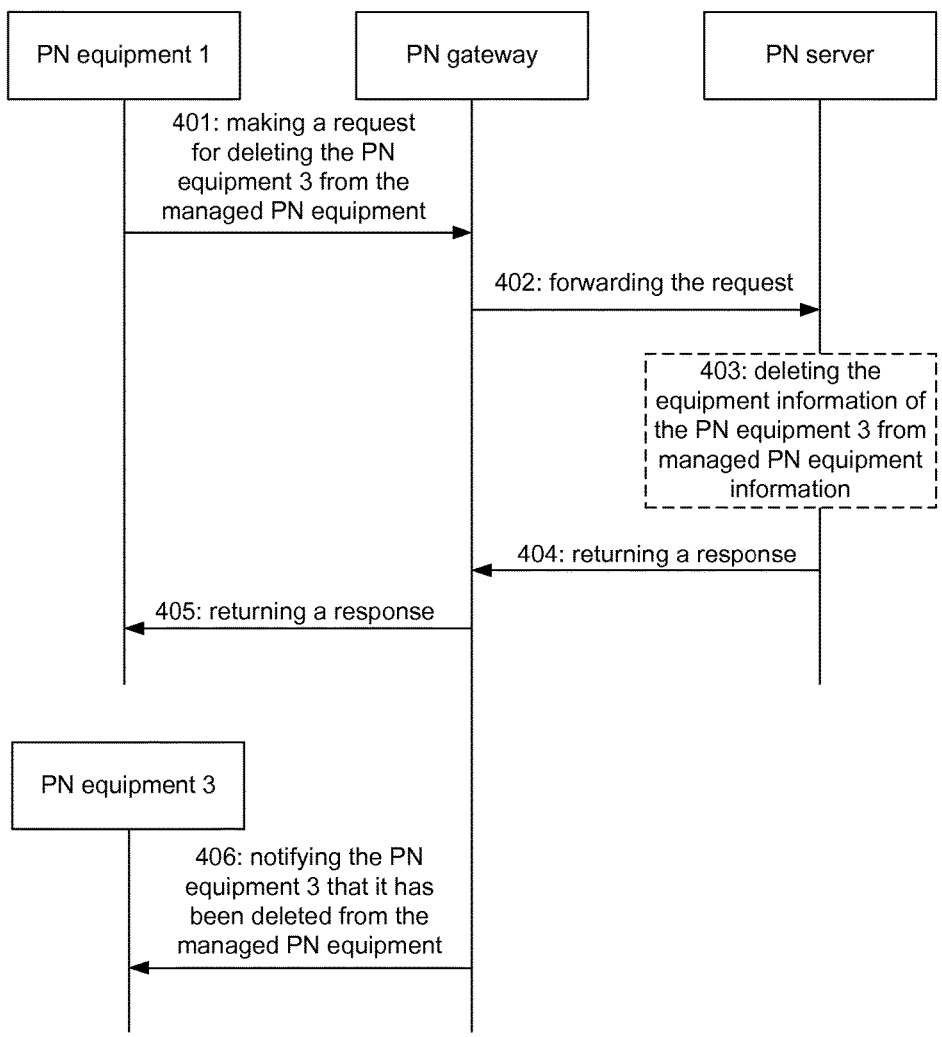

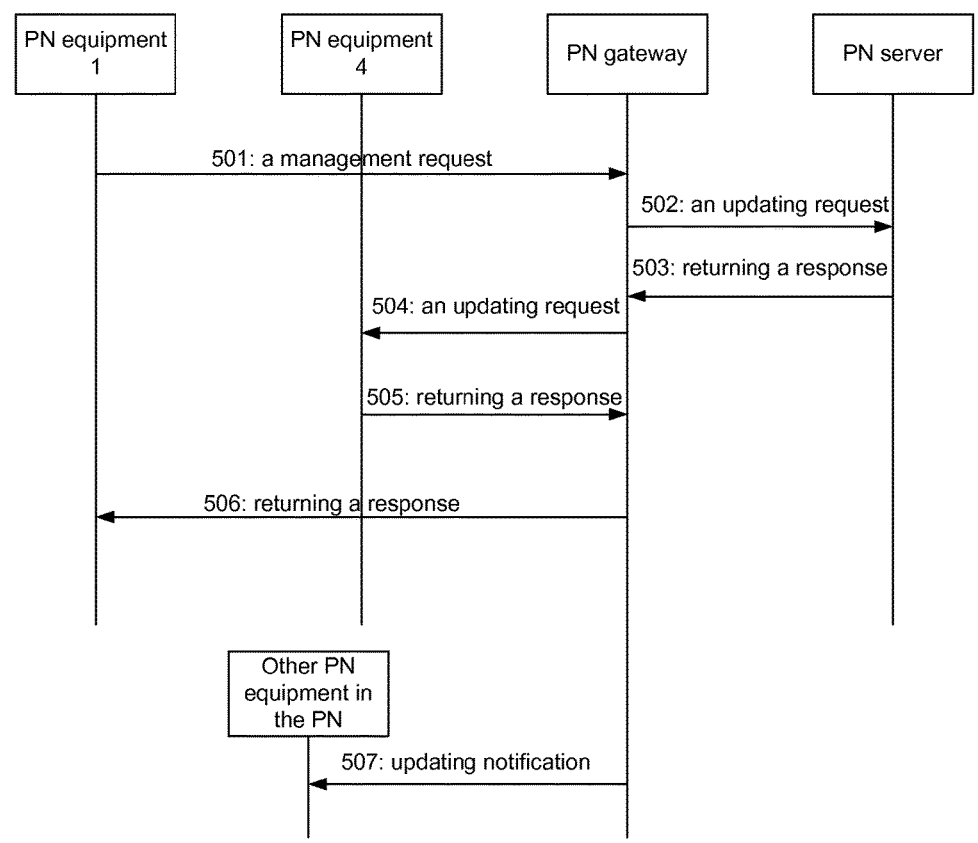

PERSONAL AREA NETWORK MANAGEMENT METHOD AND PERSONAL AREA NETWORK SYSTEM

TECHNICAL FIELD

The disclosure relates to a Personal Network (PN, or called Personal Area Network which is called PAN for short) technology, in particular to a PN management method and a PN system.

BACKGROUND

Along with the development of science and technology, a user owns more and more personal equipment, such as a mobile phone, a notebook computer, a Personal Digital Assistant (PDA), a Moving Picture Experts Group Audio Layer-3 (MP3) player and a Moving Picture Experts Group 4 (MP4) player, and most of the equipment has a short-distance communication capability, so that the user can connect these pieces of equipment together to form a PN. Chinese patent 201010207449.7 discloses a PN management method and system, which mainly discloses PN management modes of establishing a PN, releasing the PN, adding PN equipment into the PN, enabling the PN equipment to leave the PN and the like. However, excessive PN equipment increases difficulty in management over the PN, and some PN equipment does not have an effective User Interface (UI) function, which further increases the difficulty in the management by the user over the PN. Therefore, when a large amount of PN equipment exists, it is necessary to set one piece of PN equipment as a manager for managing other equipment in the PN to enable the user to conveniently, rapidly and effectively manage the PN.

SUMMARY

To this end, a main purpose of the disclosure is to provide a PN management method and a PN system, which can enable a user to conveniently, rapidly and effectively manage a PN when a large amount of PN equipment exists in the PN.

In order to achieve the above purpose, the technical solution of the disclosure is as follows.

The disclosure provides a PN management method, which includes that a PN manager is set for a PN, and manages the PN.

In the solution, setting the PN manager for the PN includes that:

PN equipment transmits a manager request including the identifier of the PN equipment and the identifier of the PN to a PN gateway of the PN;

the PN gateway forwards the manager request to a PN server;

the PN server receives the manager request, sets the PN equipment as the PN manager, adds the equipment information of the PN equipment into PN manager information, and returns a response to the PN gateway, the response including manager request success information; and the PN gateway transmits a notice to other PN equipment belonging to the PN to notify the other PN equipment of the identifier of the PN manager.

In the solution, after the PN server receives the manager request, the method includes that: the PN server judges whether the PN equipment can be the PN manager or not;

if the PN equipment can be the PN manager, the PN server determines that the PN equipment can be the PN manger, and sets the PN equipment as the PN manager; and if the PN equipment cannot be the PN manager, the PN server determines that the PN equipment cannot be the PN manager, and returns a response to the PN gateway, the response including manager request failure information.

In the solution, after the PN server returns the response to the PN gateway, the method further includes that: the PN gateway also returns the response to the PN equipment.

In the solution, that the PN manager manages the PN includes that: the PN manager initiates operation of deleting itself, and/or operation of adding PN equipment as managed PN equipment, and/or operation of deleting PN equipment from managed PN equipment and/or operation of updating the equipment information of the managed PN equipment.

In the solution, the operation of deleting the PN manager itself includes that:

the PN equipment serving as the PN manager transmits a manager deletion request to the PN gateway;

the PN gateway forwards the manager deletion request to the PN server;

the PN server deletes the PN manager of the PN, and returns a response to the PN gateway;

the PN gateway forwards the response to the PN equipment; and the PN gateway transmits a notice to the other PN equipment belonging to the PN to notify the other PN equipment that the PN manager has been deleted.

In the solution, the operation of adding PN equipment as managed PN equipment includes that:

the PN manager transmits a managed PN equipment addition request to the PN gateway to request to add first PN equipment as managed PN equipment;

the PN gateway forwards the managed PN equipment addition request to the PN server;

the PN server adds the first PN equipment as the managed PN equipment, and returns a response to the PN gateway;

the PN gateway forwards the response to the PN equipment serving as the PN manager; and the PN gateway transmits a notice to the first PN equipment to notify the first PN equipment that the first PN equipment has become the managed PN equipment.

In the solution, the operation of deleting PN equipment from managed PN equipment includes that:

the PN manager transmits a managed PN equipment deletion request to the PN gateway to request to delete second PN equipment from managed PN equipment;

the PN gateway forwards the managed PN equipment deletion request to the PN server;

the PN server deletes the second PN equipment from the managed PN equipment, and returns a response to the PN gateway;

the PN gateway forwards the response to the PN manager; and the PN gateway transmits a notice to the second PN equipment to notify the second PN equipment that the second PN equipment has been deleted from the managed PN equipment.

In the solution, the operation of updating equipment information of managed PN equipment includes that:

the PN manager transmits a management request for managing third PN equipment to the PN gateway;

the PN gateway receives the management request, and transmits an updating request for updating the equipment information of the third PN equipment to the PN server;

the PN server updates the equipment information of the third PN equipment in PN information, and returns a response to the PN gateway;

the PN gateway transmits an updating request to the third PN equipment to notify the third PN equipment to update the equipment information of the third PN equipment;

the third PN equipment receives the updating request, updates its own equipment information and returns a response to the PN gateway;

the PN gateway returns a response to the PN manager; and the PN gateway transmits a notice to the other PN equipment of the PN to notify the other PN equipment of the updated equipment information of the third PN equipment.

The disclosure also provides a PN system, which includes PN equipment which is set as a PN manager, wherein the PN equipment which is set as the PN manager is configured to manage a PN.

In the solution, the PN system further includes a PN server and a PN gateway;

the PN equipment is configured to transmit a manager request including the identifier of the PN equipment and the identifier of the PN to the PN gateway;

the PN gateway is configured to forward the manager request to the PN server, and when the PN server returns a response including manager request success information, transmit a notice to other PN equipment belonging to the current PN to notify the other PN equipment of the identifier of the PN manager; and the PN server is configured to receive the manager request, set the PN equipment as the PN manager and return the response to the PN gateway, the response including the manager request success information.

In the solution, the PN server is configured to judge whether the PN equipment can be the PN manager or not, set the PN equipment as the PN manager if the PN equipment can be the PN manager, and return a response to the PN gateway if the PN equipment cannot be the PN manager, the response including manager request failure information.

In the solution, the PN gateway is further configured to forward the response returned by the PN server to the PN equipment.

In the solution, the PN equipment set as the PN manager is configured to initiate any one or more of the following operation:

operation of deleting the PN equipment which is set as the PN manager;

operation of adding PN equipment as managed PN equipment;

operation of deleting PN equipment from managed PN equipment; and operation of updating the equipment information of managed PN equipment.

In the solution, the PN equipment set as the PN manager is further configured to transmit a manager deletion request to the PN gateway;

the PN gateway is further configured to forward the manager deletion request to the PN server, forward a response returned by the PN server to the PN equipment and transmit a notice to the other PN equipment belonging to the PN to notify the other PN equipment that the PN manager has been deleted; and the PN server is further configured to delete the PN manager of the PN when receiving the manager deletion request, and return the response to the PN gateway.

In the solution, the PN system further includes first PN equipment;

the PN equipment set as the PN manager is further configured to transmit a managed PN equipment addition request to the PN gateway to request to add the first PN equipment as the managed PN equipment;

the PN gateway is further configured to forward the managed PN equipment addition request to the PN server, forward a response returned by the PN server to the PN and transmit a notice to the first PN equipment to notify the first PN equipment that the first PN equipment has become the managed PN equipment; and the PN server is configured to receive the managed PN equipment addition request, add the first PN equipment as the managed PN equipment and return the response to the PN gateway.

In the solution, the PN system further includes second PN equipment;

the PN equipment set as the PN manager is further configured to transmit a managed PN equipment deletion request to the PN gateway to request to delete the second PN equipment from the managed PN equipment;

the PN gateway is further configured to forward the managed PN equipment deletion request to the PN server, forward a response returned by the PN server to the PN equipment and transmit a notice to the second PN equipment to notify the second PN equipment that it has been deleted from the managed PN equipment; and the PN server is configured to receive the managed PN equipment deletion request, delete the second PN equipment from the managed PN equipment and return the response to the PN gateway.

In the solution, the PN system further includes third PN equipment;

the PN equipment set as the PN manager is further configured to transmit a management request for managing the third PN equipment to the PN gateway;

the PN gateway is further configured to receive the management request, transmit an updating request for updating the equipment information of the third PN equipment to the PN server, transmit an updating request to the third PN equipment, receive a response returned by the PN server and a response returned by the third PN equipment, return the response to the PN equipment and transmit a notice to the other PN equipment of the PN to notify the other PN equipment of the updated equipment information of the third PN equipment;

the PN server is further configured to receive the updating request from the PN gateway, update the equipment information of the third PN equipment in PN information and return a response to the PN gateway; and the third PN equipment is configured to receive the updating request from the PN gateway, update its own equipment information and return a response to the PN gateway.

According to the PN management method and the PN system in the disclosure, one piece of PN equipment in the PN can be set as a PN manager to manage the PN, so that a user can set the PN manager and the managed PN equipment of his/her own PN according to his/her own needs, and when a large amount of equipment exists in the PN, some PN equipment in the PN can be conveniently, rapidly and effectively managed through the PN manager.

In addition, the user can also delete the current PN manager according to his/her own actual condition, reset another piece of PN equipment as the PN manager and update the PN manager at any time so as to effectively and rapidly manage his/her own PN. Moreover, the user can delete and add PN equipment as the managed PN equipment according to his/her own actual condition, so that the user can pertinently manage certain PN equipment to realize rapid and effective management over the PN when a large amount of PN equipment exists in the PN.

BRIEF DESCRIPTION OF THE DRAWINGS

FIG. 1 is a flowchart of making a request for becoming a PN manager by PN equipment in the disclosure;

FIG. 2 is a flowchart of making a request for deleting a PN manager by PN equipment in the disclosure;

FIG. 3 is a flowchart of adding managed PN equipment by a PN manager in the disclosure;

FIG. 4 is a flowchart of deleting managed PN equipment by a PN manager in the disclosure; and FIG. 5 is a flowchart of updating the equipment information of managed PN equipment by a PN manager in the disclosure.

DETAILED DESCRIPTION

A basic thought of the disclosure is that a PN manager is configured for a PN, and the PN is managed through the configured PN manager.

After the PN is established, a physical link is established between every two pieces of PN equipment in the PN, a PN server stores PN information, including a PN identifier and information such as the identifier and address of each piece of PN equipment in the PN.

As shown in FIG. 1, a flow of making a request for becoming a PN manager by PN equipment may specifically include the following steps that:

STEP 101: PN equipment (or called equipment of a PN) transmits a manager request to a PN gateway (or called a gateway of the PN) to request to become a PN manager (or called a manager of the PN);

here, the manager request may include the identifier of the PN and the identifier of the PN equipment;

STEP 102: the PN gateway forwards the manager request to a PN server (or called a server of the PN);

STEP 103: the PN server receives the manager request, judges whether the PN equipment can be the PN manager or not; if the PN equipment can be the PN manager, then the PN server sets the PN equipment as the PN manager, adds the information of the PN equipment into related PN manager information, and continues to execute STEP 104, otherwise directly executes STEP 104;

here, the PN server may judge whether the PN equipment can be the PN manager or not by judging whether the PN equipment has a sufficient UI or not, and/or judging whether the PN equipment has a sufficient equipment capability or not and the like; specifically, the UI and/or the equipment capability required if any PN equipment wants to be a PN manager are/is preconfigured on the PN server, and then the PN server can acquire the UI and/or equipment capability of the PN equipment after receiving the manager request, judges whether the UI and/or equipment capability of the PN equipment are/is consistent with the preconfigured UI and/or equipment capability required by the PN manager or not, determines that the PN equipment can be the PN manager if the UI and/or equipment capability of the PN equipment are/is consistent with the preconfigured UI and/or equipment capability required by the PN manager, and if not, determines that the PN equipment cannot be the PN manager;

STEP 104: the PN server returns a response to the PN gateway, wherein the response includes information indicating whether the manager request is successful or not;

here, if the PN server determines that the PN equipment can be the PN manager of the PN, and the PN information has been updated, then the response includes manager request success information; otherwise the response includes manager request failure information;

STEP 105: the PN gateway forwards the response to the PN equipment; and

STEP 106: if the response includes the manager request success information, then the PN gateway further transmits a notice to other PN equipment belonging to the PN to notify the other PN equipment of the identifier of the PN manager.

Here, the notice includes the identifier of the PN manager; the other PN equipment of the PN receives the notice, and updates its own stored corresponding PN information.

Here, if the response includes the manager request failure information, STEP 106 is then eliminated.

After the PN equipment becomes the PN manager, a request for deleting the PN manager may also be made, and as shown in FIG. 2, the process may specifically include the following steps that:

STEP 201: the PN equipment serving as the PN manager transmits a manager deletion request to the PN gateway to request to delete the PN manager;

here, the manager deletion request includes the identifier of the PN and the identifier of the PN equipment;

STEP 202: the PN gateway forwards the manager deletion request to the PN server;

STEP 203: the PN server receives the manager deletion request, deletes the PN manager, and deletes the equipment information of the PN manager from PN manager information;

specifically, information about the PN manager is deleted from the PN information, for example, the identifier and the like of the PN manager are deleted;

STEP 204: the PN server returns a response to the PN gateway;

STEP 205: the PN gateway forwards the response to the PN equipment; and

STEP 206: the PN gateway transmits a notice to the other PN equipment belonging to the PN to notify the other PN equipment that the PN manager has been deleted.

Here, the notice includes the identifier of the PN manager; the other PN equipment of the PN receives the notice, and deletes the equipment information of the PN manager from the PN information stored by the other PN equipment. For example, the identifier and the like of the PN manager are deleted from the locally stored PN information.

If there has been a PN manager in the PN, other PN equipment in the PN may make requests for becoming managed PN equipment to be managed by the PN manager.

For example, PN equipment 1 and 2 belong to the same PN, the PN equipment 1 is a PN manager, and the PN equipment 2 may make a request for becoming a managed PN equipment. As shown in FIG. 3, a specific implementation flow may include the following steps that:

STEP 301: the PN equipment 1 serving as the PN manager transmits a managed PN equipment addition request to the PN gateway to request to add the PN equipment 2 as a managed PN equipment;

here, the managed PN equipment addition request includes the identifier of the PN and the identifier of the PN equipment 2;

STEP 302: the PN gateway forwards the managed PN equipment addition request to the PN server;

STEP 303: the PN server receives the managed PN equipment addition request, and adds the PN equipment 2 as a managed PN equipment, that is, the equipment information (such as the identifier) of the PN equipment 2 is added into the managed PN equipment information of the PN;

STEP 304: the PN server returns a response to the PN gateway;

STEP 305: the PN gateway forwards the response to the PN equipment 1; and STEP 306: the PN gateway transmits a notice to the PN equipment 2 to notify the PN equipment 2 that it has become the managed PN equipment.

If there has been a PN manager and managed PN equipment in the PN, the PN equipment serving as the PN manager may also delete the managed PN equipment.

For example, PN equipment 1 and 3 belong to the same PN, the PN equipment 1 is the PN manager, the PN equipment 3 is a managed PN equipment, and as shown in FIG. 4, a specific implementation flow of deleting the PN equipment 3 by the PN equipment 1 may include the following steps that:

STEP 401: the PN equipment 1 transmits a managed PN equipment deletion request to the PN gateway to request to delete the PN equipment 3 from the managed PN equipment;

here, the managed PN equipment deletion request may include the identifier of the PN and the identifier of the PN equipment 3;

STEP 402: the PN gateway forwards the managed PN equipment deletion request to the PN server;

STEP 403: the PN server receives the managed PN equipment deletion request, and deletes the PN equipment 3 from the managed PN equipment, that is, the information (such as the identifier) of the PN equipment 3 is deleted from related information of managed PN equipment;

STEP 404: the PN server returns a response to the PN gateway;

STEP 405: the PN gateway forwards the response to the PN equipment 1; and STEP 406: the PN gateway transmits a notice to the PN equipment 3 to notify the PN equipment 3 that it has been deleted from the managed PN equipment.

If there has been a PN manager and managed PN equipment in the PN, the PN equipment serving as the PN manager may also manage the managed PN equipment.

For example, PN equipment 1 and 4 belong to the same PN, the PN equipment is the PN manager, the PN equipment 4 is a managed PN equipment, and as shown in FIG. 5, a specific implementation flow of managing the PN equipment 4 by the PN equipment 1 may include the following steps that:

STEP 501: the PN equipment 1 transmits a management request for managing the PN equipment 4 to the PN gateway;

here, the management request may include the identifier of the PN and the non-updated equipment information and updated equipment information of the PN equipment 4;

during practical application, the non-updated equipment information of the PN equipment 4 may be information such as a non-updated identifier of the PN equipment 4, and the updated equipment information of the PN equipment 4 may be information such as an updated identifier of the PN equipment 4;

STEP 502: the PN gateway receives the management request, and transmits an updating request for updating the equipment information of the PN equipment 4 to the PN server;

here, the updating request may include the identifier of the PN and the non-updated equipment information and updated equipment information of the PN equipment 4;

STEP 503: the PN server receives the updating request, updates the equipment information of the PN equipment 4 in the PN information, and returns a response to the PN gateway;

that is, the PN server receives the updating request, and modifies the equipment information of the PN equipment 4 in the PN information into the updated equipment information of the PN equipment 4 in the updating request;

STEP 504: the PN gateway transmits an updating request to the PN equipment 4 to notify the PN equipment 4 to update its equipment information;

here, the updating request may include the non-updated equipment information and updated equipment information of the PN equipment 4;

STEP 505: the PN equipment 4 receives the updating request, updates its own equipment information and returns a response to the PN gateway;

that is, the PN equipment 4 receives the updating request, and modifies its own equipment information into the updated equipment information of the PN equipment 4 in the updating request;

STEP 506: the PN gateway returns the response to the PN equipment 1; and STEP 507: the PN gateway transmits a notice to other PN equipment of the PN to notify the other PN equipment of the updated equipment information of the PN equipment 4.

During practical application, there may be one manager and one or more pieces of managed equipment in one PN. Generally, one manager and one or more pieces of managed equipment may be set for one PN. One piece of PN equipment in the PN may serve as the manager or the managed equipment of the PN. The PN server stores PN information, and the PN information may include the identifier of the PN, the equipment information of each piece of PN equipment in the PN, the equipment information of the PN manager and the equipment information of the managed PN equipment. The PN gateway and the PN equipment may also store the information of the PN to which they belong.

Correspondingly, the disclosure also provides a PN system, which includes PN equipment which is set as a PN manager, wherein the PN equipment which is set as the PN manager is configured to execute management over a PN.

The PN system further includes a PN server and a PN gateway; the PN equipment is configured to transmit a manager request including the identifier of the PN equipment and a PN identifier to the PN gateway; the PN gateway is configured to forward the manager request to the PN server, and when the PN server returns a response including manager request success information, transmit a notice to other PN equipment belonging to the current PN to notify the other PN equipment of the identifier of the PN manager; and the PN server is configured to receive the manager request, set the PN equipment as the PN manager when determining that the PN equipment can be the PN manager, and return the response to the PN gateway, the response including the manager request success information.

Here, the PN server is further configured to return a response to the PN gateway when determining that the PN equipment cannot be the PN manager, wherein the response includes manager request failure information.

Here, the PN gateway is further configured to forward the response returned by the PN server to the PN equipment.

Specifically, the PN equipment which is set as the PN manager can be configured to initiate any one or more of the following operation: deleting itself, adding PN equipment as managed PN equipment, deleting PN equipment from the managed PN equipment, and updating the equipment information of the managed PN equipment.

Specifically, the PN equipment which is set as the PN manager is further configured to transmit a manager deletion request to the PN gateway; the PN gateway is further configured to forward the manager deletion request to the PN server, forward a response returned by the PN server to the PN equipment and transmit a notice to other PN equipment belonging to the PN to notify the other PN equipment that the PN manager has been deleted; and the PN server is further configured to delete the PN manager when receiving the manager deletion request, and return the response to the PN gateway.

Specifically, the PN system further includes first PN equipment; the PN equipment which is set as the PN manager is further configured to transmit a managed PN equipment addition request to the PN gateway to request to add the first PN equipment as the managed PN equipment; the PN gateway is further configured to forward the managed PN equipment addition request to the PN server, forward a response returned by the PN server to the PN equipment and transmit a notice to the first PN equipment to notify the first PN equipment that the first PN equipment has become the managed PN equipment; and the PN server is configured to receive the managed PN equipment addition request, add the first PN equipment as the managed PN equipment and return the response to the PN gateway.

Specifically, the PN system further includes second PN equipment; the PN equipment which is set as the PN manager is further configured to transmit a managed PN equipment deletion request to the PN gateway to request to delete the second PN equipment from the managed PN equipment; the PN gateway is further configured to forward the managed PN equipment deletion request to the PN server, forward a response returned by the PN server to the PN equipment and transmit a notice to the second PN equipment to notify the second PN equipment that the second PN equipment has been deleted from the managed PN equipment; and the PN server is configured to receive the managed PN equipment deletion request, delete the second PN equipment from the managed PN equipment and return the response to the PN gateway.

Specifically, the PN system further includes third PN equipment; the PN equipment which is set as the PN manager is further configured to transmit a management request for managing the third PN equipment to the PN gateway;

the PN gateway is further configured to receive the management request, transmit an updating request for updating the equipment information of the third PN equipment to the PN server, transmit an updating request to the third PN equipment, receive a response returned by the PN server and a response returned by the third PN equipment, return a response to the third PN equipment and transmit a notice to other PN equipment to notify the other PN equipment of the updated equipment information of the third PN equipment; the PN server is further configured to receive the updating request from the PN gateway, update the equipment information of the third PN equipment in PN information and return the response to the PN gateway; and the third PN equipment is configured to receive the updating request from the PN gateway, update its own equipment information and return the response to the PN gateway.

A specific implementation process of the disclosure is further described below by examples in detail. Each of the following embodiments gives description based on the following PN of user A, wherein the PN of the user A includes a set-top box (PN gateway), a mobile phone (PN equipment), a temperature sensor (PN equipment) and an MP3 player (PN equipment).

Embodiment 1

In the embodiment, a specific flow of requesting to become a PN manager of the user A by the mobile phone of the user A may include the following steps that:

Step a1: the mobile phone of the user A transmits a manager request to the set-top box of the user A to request to become the PN manager of the user A, wherein the manager request may include the identifier of the PN of the user A and the identifier of the mobile phone of the user A;

Step a2: the set-top box of the user A forwards the manager request to a PN server;

Step a3: the PN server receives the manager request, sets the mobile phone of the user A as the PN manager of the user A when determining that the mobile phone of the user A can be the PN manager of the user A, updates the equipment information of the PN manager of the user A, and returns a response to the set-top box;

Step a4: the set-top box of the user A returns the response to the mobile phone of the user A;

Step a5: the set-top box of the user A transmits a notice to the temperature sensor and the MP3 player of the user A to notify the temperature sensor and the MP3 player that the mobile phone of the user A has become the PN manager of the user.

Embodiment 2

In the embodiment, a specific implementation flow of adding the temperature sensor as managed PN equipment of the user A by the user A may include the following steps that:

Step b1: the mobile phone of the user A transmits a managed PN equipment addition request to the set-top box of the user A to request to add the temperature sensor as the managed PN equipment of the user;

here, the addition request includes information such as the identifier of the PN of the user A and the identifier of the temperature sensor.

Step b2: the set-top box of the user A forwards the addition request to the PN server;

Step b3: the PN server receives the addition request, sets the temperature sensor of the user A as the managed PN equipment, adds the equipment information of the temperature sensor into managed PN equipment information of the user A, updates the PN information of the user A, and returns a response to the set-top box;

Step b4: the set-top box of the user A returns the response to the mobile phone of the user A; and Step b5: the set-top box of the user A transmits a notice to the temperature sensor of the user A to notify the temperature sensor that the temperature sensor has become the managed PN equipment of the user A.

Embodiment 3

In the embodiment, the mobile phone of the user A serves as the PN manager of the user A, the temperature sensor of the user A serves as the managed PN equipment of the user A, and a specific flow of updating the information of the temperature sensor of the user A by the mobile phone of the user A includes the following steps that:

Step c1: the mobile phone of the user A transmits a management request to the set-top box of the user A to request to update the equipment information of the temperature sensor;

here, the management request includes the identifier of the temperature sensor and the updated equipment information of the temperature sensor.

Step c2: the set-top box of the user A transmits an updating request for updating the equipment information of the temperature sensor to the PN server;

Step c3: the PN server receives the updating request, updates the equipment information of the temperature sensor, and returns a response to the set-top box;

Step c4: the set-top box of the user A transmits an updating request to the temperature sensor of the user A to notify the temperature sensor of the user A to update the equipment information of the temperature sensor;

Step c5: the set-top box of the user A receives the updating request, updates the equipment information of the set-top box, and returns a response to the mobile phone of the user A; and Step c6: the set-top box of the user A transmits a notice to the MP3 player of the user A to notify the MP3 player of the user A of the updated equipment information of the temperature sensor.

Embodiment 4

In the embodiment, the mobile phone of the user A serves as the PN manager of the user A, the temperature sensor serves as the managed PN equipment of the user A, and a specific implementation flow of deleting the temperature sensor from the managed PN equipment of the user A by the user A may include the following steps that:

Step d1: the mobile phone of the user A transmits a managed PN equipment deletion request to the set-top box of the user A to request to delete the temperature sensor from the managed PN equipment of the user;

Step d2: the set-top box of the user A forwards the deletion request to the PN server;

Step d3: the PN server receives the deletion request, deletes the temperature sensor from the managed PN equipment of the user A, deletes the equipment information of the temperature sensor from the managed PN equipment information of the user A, and returns a response to the set-top box;

Step d4: the set-top box of the user A returns the response to the mobile phone of the user A; and Step d5: the set-top box of the user A transmits a notice to the temperature sensor of the user A to notify the temperature sensor that the temperature sensor has been deleted from the managed PN equipment of the user A.

Embodiment 5

In the embodiment, the mobile phone of the user A does not want to be the PN manager of the user A, and a specific implementation flow may include the following steps that:

Step e1: the mobile phone of the user A transmits a PN manager deletion request to the set-top box of the user A to request to no longer be the PN manager of the user A, wherein the request includes the identifier of the PN of the user A and the identifier of the mobile phone;

Step e2: the set-top box of the user A forwards the PN manager deletion request to the PN server;

Step e3: the PN server receives the PN manager deletion request, sets the mobile phone of the user A not to be the PN manager of the PN any longer, deletes the equipment information of the mobile phone from the PN manager information of the user A, and returns a response to the set-top box;

Step e4: the set-top box of the user A returns the response to the mobile phone of the user A; and Step e5: the set-top box of the user A transmits a notice to the temperature sensor and the MP3 player of the user A to notify the temperature sensor and the MP3 player that the mobile phone of the user A is not the PN manager of the user any longer.

The above are only the preferred embodiments of the disclosure and not intended to limit the scope of protection of the disclosure.

What is claimed is:

1. A Personal Area Network (PN) management method, comprising:
   setting one piece of PN equipment in the PN as a PN manager for managing the PN; and
   managing the PN by the PN manager;
   wherein managing the PN by the PN manager comprises:
      deleting the PN manager itself; wherein deleting the PN manager itself comprises:
      transmitting, by PN equipment serving as the PN manager, a manager deletion request to a PN gateway;
      forwarding, by the PN gateway, the manager deletion request to a PN server;
      deleting, by the PN server, the PN manager of the PN, and returning a response to the PN gateway;
      forwarding, by the PN gateway, the response to the PN equipment; and
      transmitting, by the PN gateway, a notice to other PN equipment belonging to the PN to notify the other PN equipment that the PN manager has been deleted;
   wherein the PN includes the PN equipment serving as the PN manager, the PN gateway, the PN server and the other PN equipment.

2. The PN management method according to claim 1, wherein setting the PN manager for the PN comprises:
   transmitting, by PN equipment, a manager request comprising an identifier of the PN equipment and an identifier of the PN to a PN gateway of the PN;
   forwarding, by the PN gateway, the manager request to a PN server;
   receiving, by the PN server, the manager request, setting the PN equipment as the PN manager, adding equipment information of the PN equipment into PN manager information, and returning a response to the PN gateway, wherein the response comprises manager request success information; and
   transmitting, by the PN gateway, a notice to other PN equipment belonging to the PN to notify the other PN equipment of an identifier of the PN manager.

3. The PN management method according to claim 2, after receiving by the PN server the manager request, the method comprising:
   judging, by the PN server, whether the PN equipment can be the PN manager or not;
   if the PN equipment can be the PN manager, determining, by the PN server, that the PN equipment can be the PN manger, and setting the PN equipment as the PN manager; and
   if the PN equipment cannot be the PN manager, determining, by the PN server, that the PN equipment cannot be the PN manager, and returning a response to the PN gateway, wherein the response comprises manager request failure information.

4. The PN management method according to claim 2, after returning by the PN server the response to the PN gateway, the method further comprising: returning, by the PN gateway, the response to the PN equipment.

5. The PN management method according to claim 1, wherein managing the PN by the PN manager comprises: initiating, by the PN manager, at least one of following operation: adding PN equipment as managed PN equipment, deleting PN equipment from managed PN equipment, and updating equipment information of managed PN equipment.

6. The PN management method according to claim 5, wherein the operation of adding PN equipment as managed PN equipment comprises:
  transmitting, by PN equipment serving as the PN manager, a managed PN equipment addition request to a PN gateway to request to add first PN equipment as managed PN equipment;
  forwarding, by the PN gateway, the managed PN equipment addition request to a PN server;
  adding, by the PN server, the first PN equipment as the managed PN equipment, and returning a response to the PN gateway;
  forwarding, by the PN gateway, the response to the PN equipment serving as the PN manager; and
  transmitting, by the PN gateway, a notice to the first PN equipment to notify the first PN equipment that the first PN equipment has become the managed PN equipment.

7. The PN management method according to claim 5, wherein the operation of deleting PN equipment from managed PN equipment comprises:
  transmitting, by the PN manager, a managed PN equipment deletion request to a PN gateway to request to delete second PN equipment from managed PN equipment;
  forwarding, by a PN gateway, the managed PN equipment deletion request to a PN server;
  deleting, by the PN server, the second PN equipment from the managed PN equipment, and returning a response to the PN gateway;
  forwarding, by the PN gateway, the response to the PN manager; and
  transmitting, by the PN gateway, a notice to the second PN equipment to notify the second PN equipment that the second PN equipment has been deleted from the managed PN equipment.

8. The PN management method according to claim 5, wherein the operation of updating equipment information of managed PN equipment comprises:
  transmitting, by the PN manager, a management request for managing third PN equipment to a PN gateway;
  receiving, by the PN gateway, the management request, and transmitting an updating request for updating equipment information of the third PN equipment to a PN server;
  updating, by a PN server, the equipment information of the third PN equipment in PN information, and returning a response to the PN gateway;
  transmitting, by the PN gateway, an updating request to the third PN equipment to notify the third PN equipment to update the equipment information of the third PN equipment;
  receiving, by the third PN equipment, the updating request, updating its own equipment information and returning a response to the PN gateway;
  returning, by the PN gateway, a response to the PN manager; and
  transmitting, by the PN gateway, a notice to other PN equipment of the PN to notify the other PN equipment of updated equipment information of the third PN equipment.

9. A Personal Network (PN) system, comprising one piece of PN equipment which is set as a PN manager in the PN for managing the PN, wherein the PN equipment which is set as the PN manager is configured to manage a PN;
  wherein the PN equipment which is set as the PN manager is configured to initiate at least one of following operation: deleting the PN equipment which is set as the PN manager;
  wherein
  the PN equipment which is set as the PN manager is further configured to transmit a manager deletion request to the PN gateway;
  the PN gateway is further configured to forward the manager deletion request to the PN server, forward a response returned by the PN server to the PN equipment and transmit a notice to the other PN equipment belonging to the PN to notify the other PN equipment that the PN manager has been deleted; and
  the PN server is further configured to delete the PN manager of the PN when receiving the manager deletion request, and return the response to the PN gateway.

10. The PN system according to claim 9, further comprising a PN server and a PN gateway, wherein
  the PN equipment is configured to transmit a manager request comprising an identifier of the PN equipment and an identifier of the PN to the PN gateway;
  the PN gateway is configured to forward the manager request to the PN server, and when the PN server returns a response comprising manager request success information, transmit a notice to other PN equipment belonging to the PN to notify the other PN equipment of an identifier of the PN manager; and
  the PN server is configured to receive the manager request, set the PN equipment as the PN manager and return the response to the PN gateway, the response comprising the manager request success information.

11. The PN system according to claim 10, wherein the PN server is configured to judge whether the PN equipment can be the PN manager or not, set the PN equipment as the PN manager if the PN equipment can be the PN manager, otherwise return a response to the PN gateway, the response comprising manager request failure information.

12. The PN system according to claim 10, wherein the PN gateway is further configured to forward the response returned by the PN server to the PN equipment.

13. The PN system according to claim 11, wherein the PN equipment which is set as the PN manager is configured to initiate at least one of following operation:
  adding PN equipment as managed PN equipment;
  deleting PN equipment from managed PN equipment; and
  updating equipment information of managed PN equipment.

14. The PN system according to claim 13, further comprising first PN equipment, wherein
  the PN equipment which is set as the PN manager is further configured to transmit a managed PN equipment addition request to the PN gateway to request to add the first PN equipment as the managed PN equipment;
  the PN gateway is further configured to forward the managed PN equipment addition request to the PN server, forward a response returned by the PN server to the PN and transmit a notice to the first PN equipment to notify the first PN equipment that the first PN equipment has become the managed PN equipment; and the PN server is configured to receive the managed PN equipment addition request, add the first PN equipment as the managed PN equipment and return the response to the PN gateway.

15. The PN system according to claim 13, further comprising second PN equipment, wherein
the PN equipment which is set as the PN manager is further configured to transmit a managed PN equipment deletion request to the PN gateway to request to delete the second PN equipment from the managed PN equipment;

the PN gateway is further configured to forward the managed PN equipment deletion request to the PN server, forward a response returned by the PN server to the PN equipment and transmit a notice to the second PN equipment to notify the second PN equipment that it has been deleted from the managed PN equipment; and the PN server is configured to receive the managed PN equipment deletion request, delete the second PN equipment from the managed PN equipment and return the response to the PN gateway.

16. The PN system according to claim 13, further comprising third PN equipment, wherein the PN equipment which is set as the PN manager is further configured to transmit a management request for managing the third PN equipment to the PN gateway;

the PN gateway is further configured to receive the management request, transmit an updating request for updating equipment information of the third PN equipment to the PN server, transmit an updating request to the third PN equipment, receive a response returned by the PN server and a response returned by the third PN equipment, return a response to the PN equipment and transmit a notice to the other PN equipment of the PN to notify the other PN equipment of updated equipment information of the third PN equipment;

the PN server is further configured to receive the updating request from the PN gateway, update the equipment information of the third PN equipment in PN information and return the response to the PN gateway; and the third PN equipment is configured to receive the updating request from the PN gateway, update the equipment information of the third PN equipment and return the response to the PN gateway.

17. The PN management method according to claim 3, after returning by the PN server the response to the PN gateway, the method further comprising: returning, by the PN gateway, the response to the PN equipment.

18. The PN system according to claim 11, wherein the PN gateway is further configured to forward the response returned by the PN server to the PN equipment.

* * * * *